United States Patent
Skvorecz (10) Patent No.: US 10,123,653 B2
(45) Date of Patent: Nov. 13, 2018

(54) THREE WIRE, WIRE CHAFING STAND (71) Applicant: Robert J. Skvorecz, Kinnelon, NJ (US)

(72) Inventor: Robert J. Skvorecz, Kinnelon, NJ (US)

(*) Notice: Subject to any disclaimer, the term of this patent is extended or adjusted under 35 U.S.C. 154(b) by 0 days.

(21) Appl. No.: 15/479,367

(22) Filed: Apr. 5, 2017

(65) Prior Publication Data
US 2018/0289210 A1   Oct. 11, 2018

(51) Int. Cl.
*A47J 36/34* (2006.01)
*B65D 6/08* (2006.01)

(52) U.S. Cl.
CPC ............... *A47J 36/34* (2013.01); *B65D 7/20* (2013.01)

(58) Field of Classification Search
CPC .. A47J 36/34; A47J 47/00; B65D 7/20; B65D 21/00; B65D 7/14
USPC .......... 248/153, 175, 465.1, 112, 218.1, 249, 248/302; 211/181.1, 41.4, 90.03, 112, 211/119, 126.8, 126.9, 133.2, 133.5; 126/40; 220/743
See application file for complete search history.

(56) References Cited

U.S. PATENT DOCUMENTS

| | | | |
|---|---|---|---|
| 138,538 A * | 5/1873 | Sherwood | F16M 11/00 248/175 |
| 215,180 A | 5/1879 | Stiles | |
| 240,891 A * | 5/1881 | Cook | A47J 36/022 220/743 |
| 578,012 A * | 3/1897 | Harris | A61J 19/06 4/285 |
| 983,473 A | 2/1911 | Barnes | |
| 1,485,852 A | 3/1924 | Jarvis | |
| 1,688,846 A | 10/1928 | Andrews | |
| 1,947,932 A | 2/1934 | Fante | |
| 2,007,997 A | 7/1935 | Abernethy | |
| 2,110,726 A | 3/1938 | Harvey | |
| 2,190,065 A | 2/1940 | Griffin | |
| 2,269,425 A | 1/1942 | Bitney | |
| 2,673,053 A | 3/1954 | Kilian | |
| 2,739,466 A | 3/1956 | Maliniak | |
| D181,149 S * | 10/1957 | Hoffstein et al. | 248/153 |
| 2,837,624 A | 6/1958 | Katzman et al. | |
| 2,838,198 A | 6/1958 | Vidal | |
| D189,469 S | 12/1960 | Fischer | |
| 2,979,242 A | 4/1961 | Van Huis et al. | |
| D193,957 S * | 10/1962 | Young | 220/743 |
| 3,160,308 A | 12/1964 | Hare et al. | |
| 3,276,733 A | 10/1966 | Rosser | |

(Continued)

*Primary Examiner* — Muhammad Ijaz
(74) *Attorney, Agent, or Firm* — Michael J. Feigin, Esq.; Feigin and Fridman LLC (57) ABSTRACT

A chafer wire stand of three lengths of wire has one length of wire as an upper loop and the other two substantially identical to each other, as well as being mirror images of themselves. These two lengths of wire are laid out perpendicular to each other, and each end thereof attaches to the upper loop. These two lengths are connected to the upper loop, then have a vertical drop to the bottom followed by a section acutely angled back upwards, then an acute angled drop to the bottom again in a second vertical section. Then a right angle connection from the vertical section to a horizontal section forms the outline or exterior of a receptacle for a heat source. This half wire section is repeated three more times (two wires, two half wire sections each) forming an economical wire chafing stand which only requires four or five weld points.

15 Claims, 6 Drawing Sheets

(56) References Cited

U.S. PATENT DOCUMENTS

| | | |
|---|---|---|
| 3,305,125 A | 2/1967 | Chesley |
| D213,899 S | 4/1969 | Rickmeier, Jr. |
| 3,650,384 A | 3/1972 | Pegg |
| 3,848,748 A | 11/1974 | Ceccarelli |
| 3,939,980 A | 2/1976 | King |
| 3,939,981 A | 2/1976 | King |
| 4,025,013 A | 5/1977 | Anantharaman |
| 4,079,836 A | 3/1978 | Von Stein et al. |
| 4,135,691 A | 1/1979 | Wiesmann |
| 4,557,200 A | 12/1985 | Geschwender |
| D288,053 S * | 2/1987 | Maza ............................. D7/704 |
| 4,718,402 A | 1/1988 | Fordyce |
| 4,899,722 A | 2/1990 | Horewitch |
| 4,920,873 A | 5/1990 | Stevens |
| 5,065,735 A | 11/1991 | Bourgeois et al. |
| 5,103,799 A * | 4/1992 | Atanasio ............. A47J 37/0763 126/25 A |
| 5,282,458 A | 2/1994 | Trimble |
| 5,287,800 A * | 2/1994 | Orednick ................. A47F 3/14 126/9 R |
| 5,301,909 A | 4/1994 | Chang |
| 5,503,062 A | 4/1996 | Buff, IV |
| 5,819,640 A | 10/1998 | Cuomo |
| D406,984 S | 3/1999 | Skvorecz |
| 5,921,513 A * | 7/1999 | Skvorecz ............. B65D 21/046 126/40 |
| 5,996,948 A | 12/1999 | Skvorecz |
| 6,047,932 A | 4/2000 | Skvorecz |
| 6,170,405 B1 | 1/2001 | Weitzman et al. |
| 6,213,005 B1 | 4/2001 | Sherman |
| 6,234,068 B1 | 5/2001 | Sherman |
| 6,520,354 B1 * | 2/2003 | Skvorecz ............. A47J 36/2477 211/181.1 |
| D485,706 S | 1/2004 | O'Connell Cooper et al. |
| 6,698,335 B1 * | 3/2004 | Bourgeois ............... A47J 27/04 126/30 |
| 2008/0251657 A1 * | 10/2008 | Skvorecz ................ A47J 36/34 248/153 |
| 2016/0128509 A1 * | 5/2016 | Skvorecz ............. A47J 36/2405 248/153 |
| 2016/0280417 A1 * | 9/2016 | Skvorecz ................ B65D 7/20 |

* cited by examiner

THREE WIRE, WIRE CHAFING STAND

FIELD OF THE DISCLOSED TECHNOLOGY

This invention relates to wire chafing stands and, in particular, a wire chafing stand of a simple construction.

BACKGROUND OF THE DISCLOSED TECHNOLOGY

Chafers and chaffing stands are used to hold pans, often with a heating device held below the pan. Catering establishments and restaurants often use such devices when keeping food warm at a location other than where the food was initially prepared. For example, chafers are used in places such as banquet halls and the like, where large amounts of food are constantly being served.

The chafers, usually in the form of rectangular metal receptacles, are of a normally standard dimensional size and are filled with food to be heated and/or served. Chafers are commonly supported upon transportable wire stands during both heating and serving, with each of the wire stands being hereinafter referred to as a "wire chafing stand" and usually being composed of steel. The wire chafing stand of the prior art, as exemplified by U.S. Pat. No. 5,921,513, issued to Robert Skvorecz, is a relatively simple structure having an upper rim and a lower rim formed of respective larger and smaller rectangular wire structures around a respective rectangular opening. The upper and lower rims are connected to each other by means of wire legs to form a frusto-pyramidical structure dimensioned to hold and support a chafer containing food. The wire legs are usually welded to the upper and lower rims at the corners of the structure, with the wire legs extending below the lower rim, so that they also function as bottom supports to keep the stand level with the ground and to maintain the lower rim at a predetermined height above ground level for placement of chafing fuel heaters for the chafing dish in the stand.

Because numerous chafers are used at occasions, where required, numerous wire chafing stands are also required, with both the chafers and the wire chafing stands being respectively transported, stored and nested together in multiple units. Presently, wire chafing stands, such as those shown and described in the aforementioned patent, permit the stands to be partially nested into one another when stacked; i.e., the stands nest, however only to a limited extent. As further described in said patent, the cost of storage and transportation has a direct relationship to the vertical height of a stack of nested wire stands. Accordingly, for wire stands with only limited nesting capability, the transportation cost for transporting such wire stands over long distances becomes a significant factor in its selling price. This, in turn, reduces the ability to compete over large geographical areas where transportation cost and/or storage cost become too large.

Further, wire chafing stands of increased complexity are more difficult and expensive to manufacture. The greater the length of wire needed, the more wire needed, and/or the more weld points, the greater the expense. Sometimes it is necessary to increase the length of wire or weld points to increase stability, but sometimes it is desirable to reduce costs of material and production as much as possible. However, one must still produce a safe wire chafing stand which won't tip and which can hold a fuel source as well as a tray of food without danger.

There is therefore a need in the art to provide a wire chafing stand which is simpler to manufacture and less expensive to procure than known in the prior art.

SUMMARY OF THE DISCLOSED TECHNOLOGY

The present application is directed towards a wire stand for a chafer, or wire chafing stand.

A method of forming a wire chafing stand is carried out by forming a closed loop from a first length of wire. From both a second and third length of wire one bends them identically. (Any term used can be carried out as indicated or substantially as indicated, e.g. "substantially identically".). Further, the second and third wires are bent with symmetry about a midpoint of each wire, such that they are mirrored on both sides of the midpoint. In order from an extreme end of each wire inwards to the midpoint there is a first acute bend, a second acute bend, and a right angle bend. Thus, there are four identical wire halves on two wires. The second and third length of wires are then attached together at a midpoint of each, and the ends (point on the wire furthest away from the midpoint before the wire is bent/when the wire is in a straight line segment) are attached to the closed loop, Each point of attachment can be in the form of a butt weld.

The second and third lengths of wire are perpendicular to each other, in embodiments of the disclosed technology. The midpoint is surrounded by four lengths of wire (wire segments of the second and third wire, each) which are parallel to the closed loop, in embodiments of the disclosed technology. A section of the second wire between the closed loop and the first acute bend is perpendicular to the closed loop, in embodiments of the disclosed technology.

Further, the wire chafing stand can have exactly five weld points or places. One can weld once at the midpoint connecting the second wire to the third wire and once at each of the four ends of the second wire (having two ends) and third wire (having two more ends) which connect the second and third wires to the closed loop.

Described another way, a wire chafing stand of embodiments of the disclosed technology has two lines of symmetry and a single fuel receptacle. For purposes of this disclosure, a fuel receptacle is a section with flat bottom and parts of side walls adapted for supporting a canister or other holder of fuel. Such a wire chafer has an upper wire formed in a loop, a first half of a first lower wire extending, in order, perpendicularly from the upper wire until reaching a first acute angle bend, then extending until a second acute angle bend, then extending perpendicular to the upper wire until reaching a perpendicular bend, and then extending in parallel to the upper wire. A second half of the first lower wire is then a mirror image of the first half of the lower wire. A second lower wire substantially identical or identical to the first lower wire is fixedly connected (to the closed loop) perpendicular to the first lower wire.

A midpoint of the first lower wire and the second lower wire is an attachment point where the first lower wire and the second lower wire are fixedly attached, in some embodiments. The first acute bend and the portion of the wire extending parallel to the upper wire are equidistant from a plane defined by the upper loop, in embodiments of the disclosed technology. Such a "plane defined by the upper loop" refers to an imaginary plane through which the top (and bottom) side of the upper loop passes, or what one would refer to as a flat upper side of the wire chafing stand.

In embodiments, the second acute bend is a closest portion (of the first lower wire) to the plane defined by the upper loop, except for the vertical portion which extends perpendicularly from the upper wire.

Described yet another way, a wire chafing stand has a first lower wire and a second lower wire which are substantially identical to each other and at right angles to each other. A single intersection point of the first lower wire to the second lower wire is at a midpoint of each respective wire in this embodiment. A point of symmetry of each of the first lower wire and the second lower wire is this midpoint of each wire, and an upper wire connects to the first lower wire at exactly two points, and the second lower wire at exactly two points. A receptacle formed from a straight length of wire of the first lower wire and a straight length of wire of the second lower wire, each such straight length of wire passing through the midpoint and terminating at a perpendicular bend. (Additional items, such as solid walls, can be placed within/form the receptacle as well.)

Four vertical sections of wire extend from the upper wire at a right angle there-to in embodiments, wherein the first lower wire has two of the four vertical sections and the second lower wire has two of the four vertical sections. Four angled sections of wire each extend from one of the four vertical sections of wire to a portion of wire extending from the section of wire emanating from the perpendicular bend. A weld point (place where two wires are welded together) at the single intersection point of the first lower wire to the second lower wire fixedly connect the first lower wire to the second lower wire, in embodiments of the disclosed technology. Exactly four additional weld points, in some embodiments, connect the upper wire to one of the first lower wire or the second lower wire.

A heat source receptacle (also referred to herein as a receptacle or fuel source receptacle) has four vertical side walls (or portions thereof) and one horizontal lower wall (or portion thereof) which is formed 50% from the first lower wire and 50% from the second lower wire.

The term "wedging" is defined as "two objects fixed into position requiring force in a measurable amount at least 10% greater than moving either object separately, excluding gravitational force acting on the object(s)."

The term "substantially" is defined as "considered to be so by one having ordinary skill in the art of chafer wire stands" and/or "at least 90% of the term being modified by 'substantially.'" More specifically, the term "substantially perpendicular" is defined as "between 150 and 210 degrees" (within 30 degrees of mathematically perpendicular).

The term "generally" used herein is defined as a majority of the modified and described term following the word "generally."

The terms "or" and "and/or" should be interpreted as being inclusive of one or both terms being joined thereby. For example, in the set {A, B}, the phrase "A or B" includes "A," "B," and "A and B."

DETAILED DESCRIPTION OF EMBODIMENTS OF THE DISCLOSED TECHNOLOGY

The present technology is directed to a wire chafing stand having three wires. One wire forms a continuous loop, and the other two wires are identical, or substantially identical, and are attached to each other at right angles. These two wires are further attached to the continuous loop at opposite sides thereof and have four acute bends and two right angle bends, each. This allows for formation of a fuel receiving cavity on top of where the two lower wires cross each other. Further, in embodiments, each lower wire has exactly three weld points and the chafing stand has a total of five weld points, or six when counting welds to the continuous loop.

Embodiments of the disclosed technology will become more clear in view of the following description of the drawings.

Figure 1:
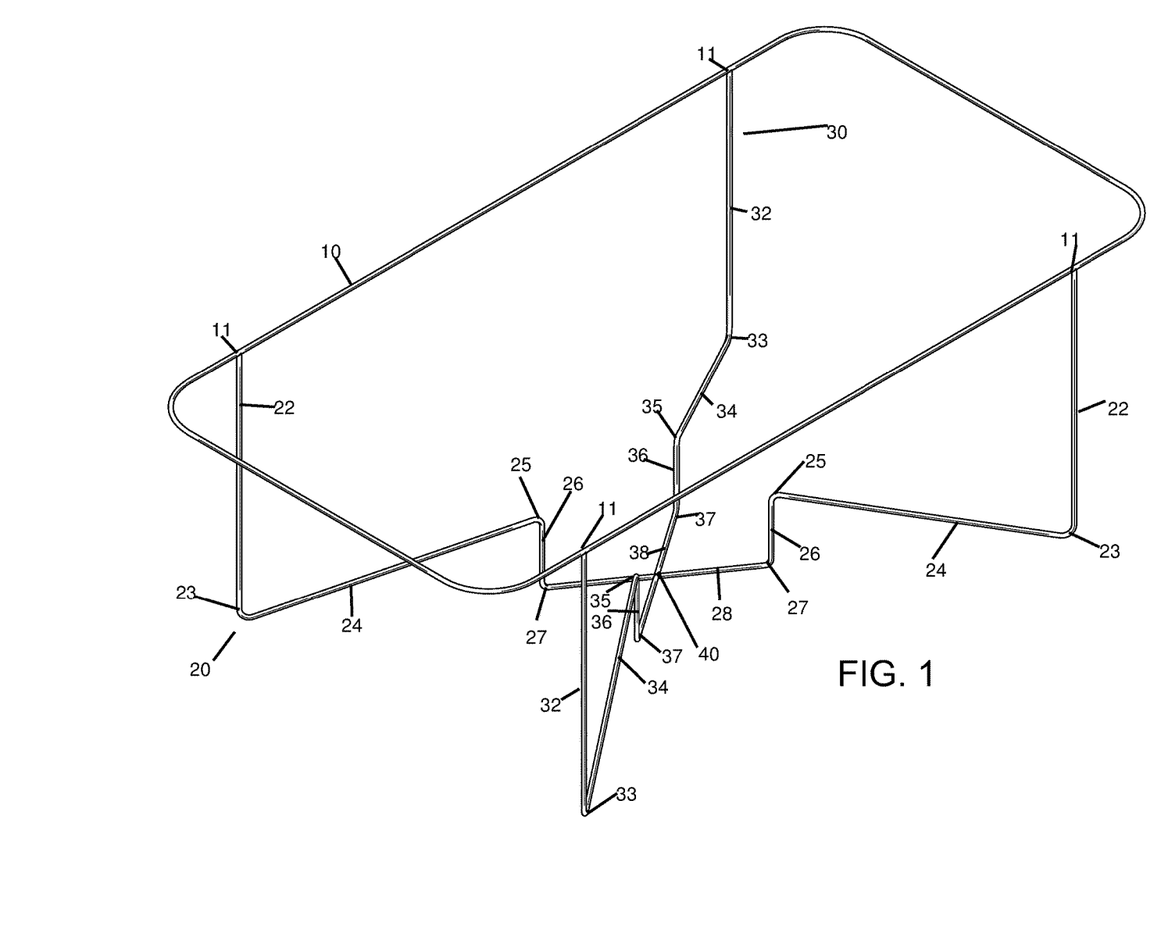
FIG. 1 is a top and side perspective view of a wire chafer stand of embodiments of the disclosed technology.
Figure 2:
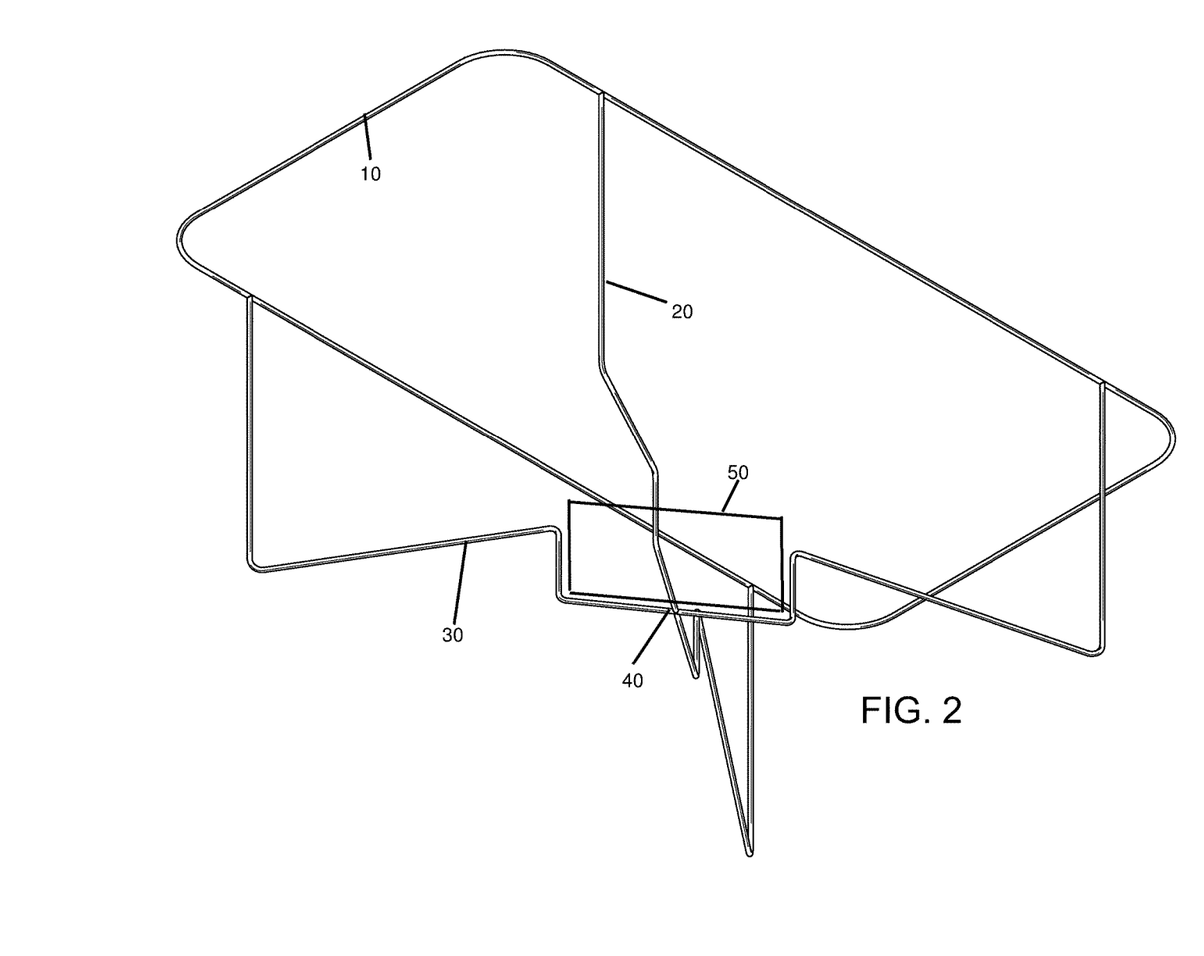
FIG. 2 is a top and reverse side perspective view of the wire chafer stand with fuel source and limited numbering of parts.
Figure 3:
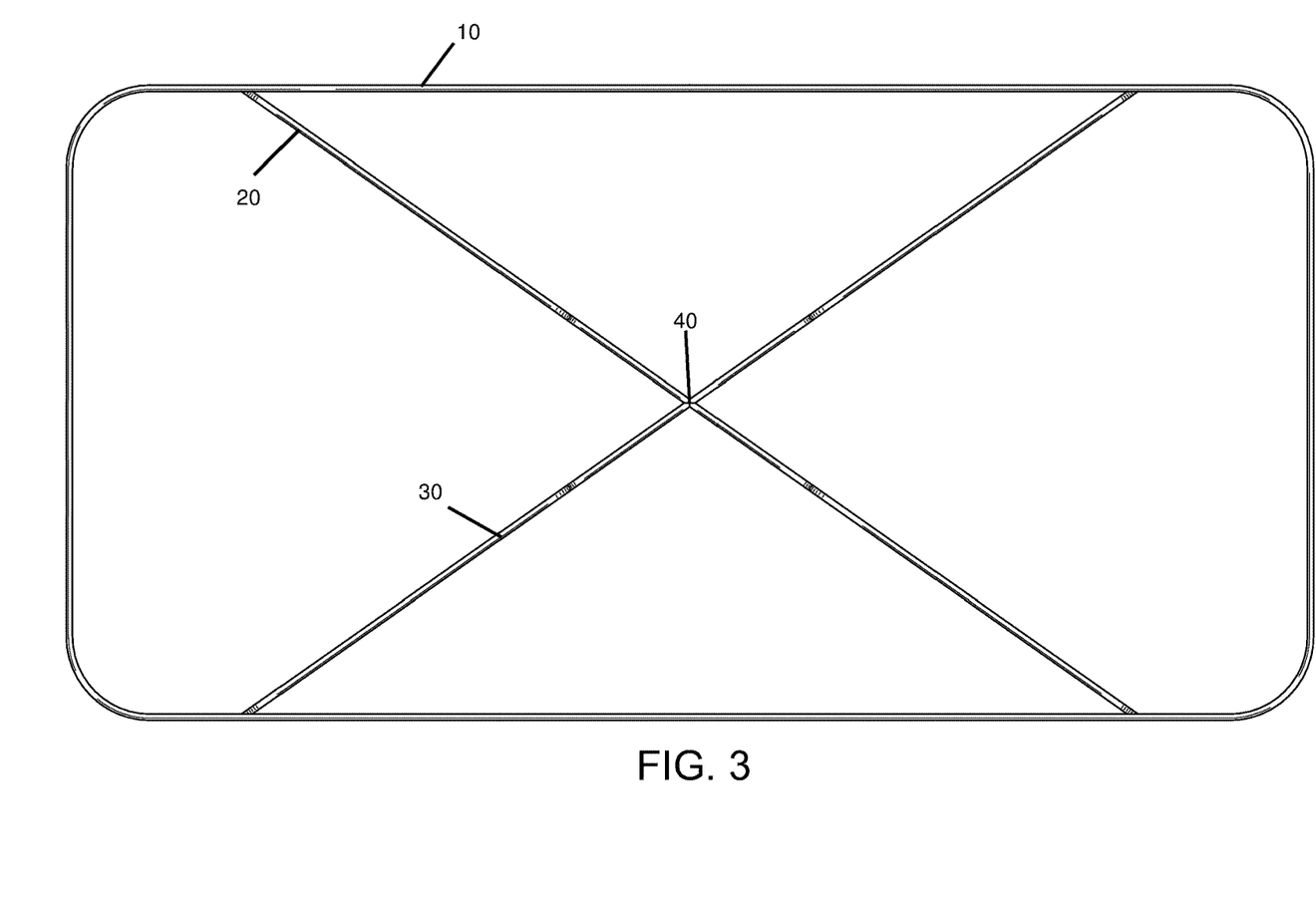
FIG. 3 a top view of the wire chafer stand of embodiments of the disclosed technology.
Figure 4:
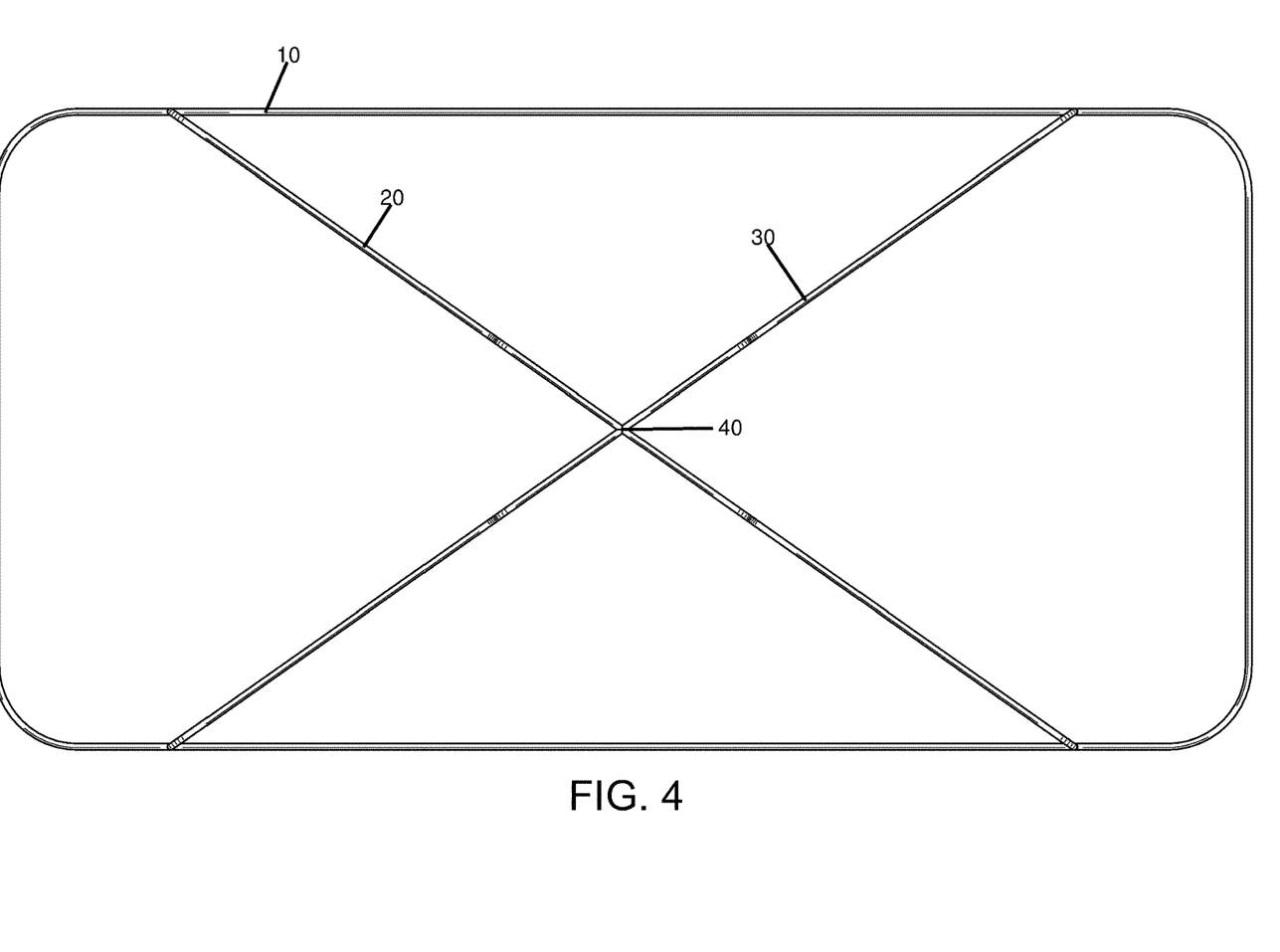
FIG. 4 a bottom view of the wire chafer stand of embodiments of the disclosed technology.
Figure 5:
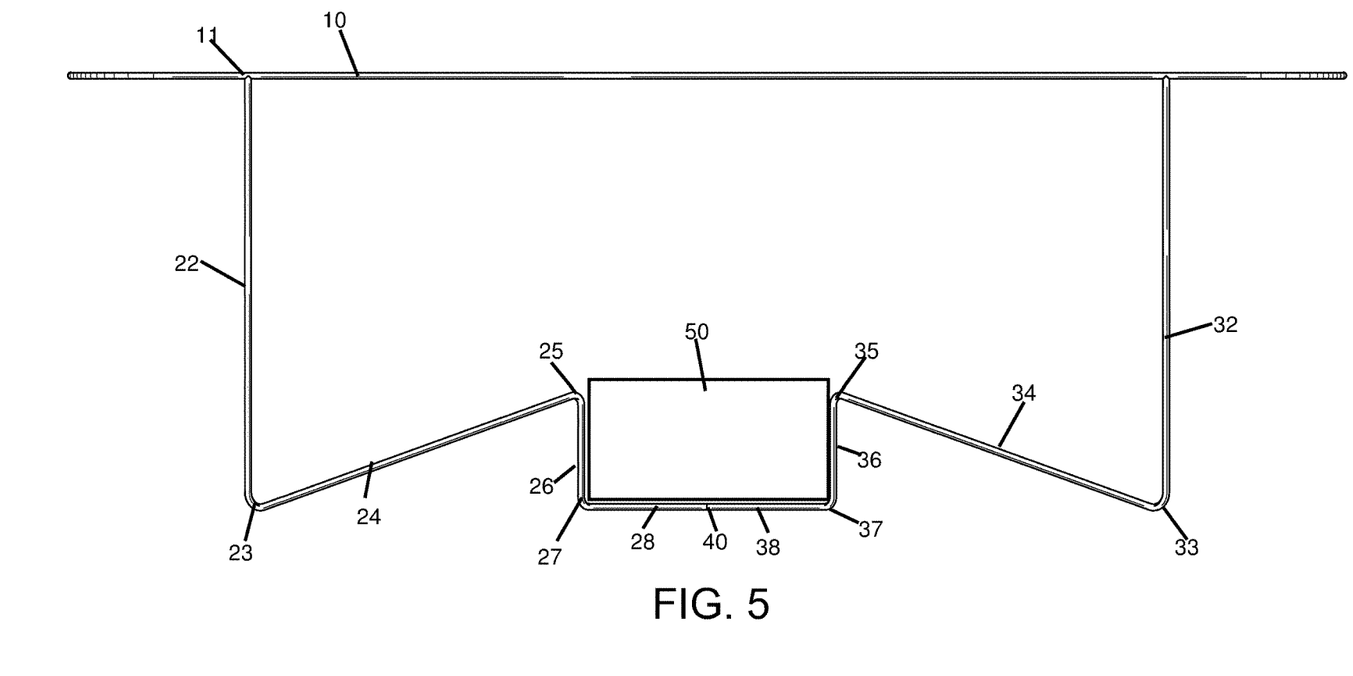
FIG. 5 is a long side view of the wire chafer stand of embodiments of the disclosed technology.
Figure 6:
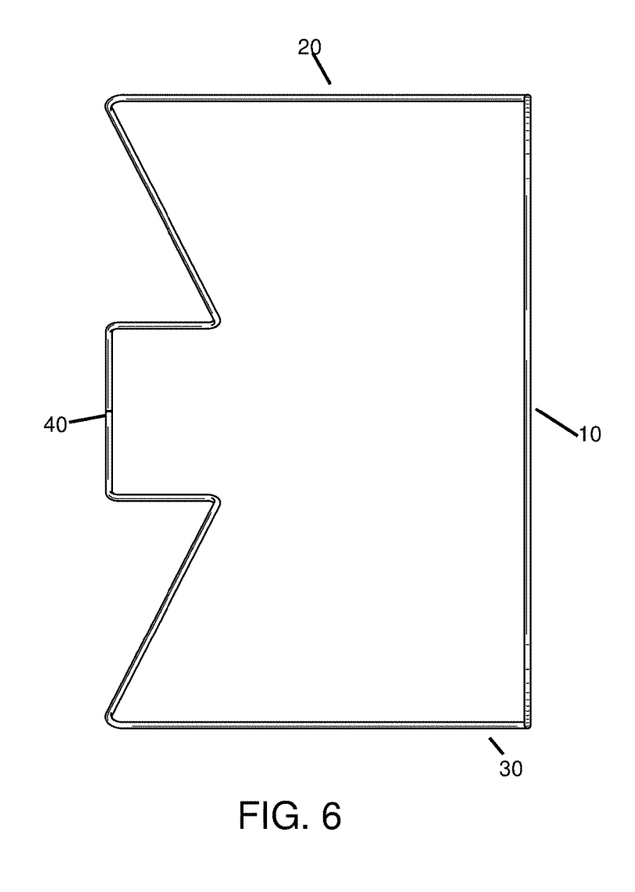
FIG. 6 is a short side view of the wire chafer stand of embodiments of the disclosed technology.

The figures show different views of the wire chafing stand of embodiments of the disclosed technology. In some views, detailed numbering of parts has been given, while, in others, a more sparse numbering has been given, as the detailed numbering is repetitive. The more sparse numbering allows one to better see the device in such views. FIG. 1 is a top and side perspective view of a wire chafer stand, of embodiments of the disclosed technology. FIG. 2 is a top and reverse side perspective view of the wire chafer stand with fuel source and limited numbering of parts. FIG. 3 is a top view of the wire chafer stand, of embodiments of the disclosed technology. FIG. 4 is a bottom view of the wire chafer stand, of embodiments of the disclosed technology. FIG. 5 is a long side view of the wire chafer stand, of embodiments of the disclosed technology. FIG. 6 is a short side view of the wire chafer, of embodiments of the disclosed technology.

The wire chafing/chafer stand of embodiments of the disclosed technology has exactly five weld points and three wires. A first upper wire 10 encloses an area, such as a rectangle or rounded rectangle (a rectangle with corners rounded off). The second 20 and third wires 30 are identical, or substantially identical, in embodiments of the disclosed technology. Each second 20 and third 30 wire has, in embodiments, a point of symmetry about its midpoint 40. The midpoint 40 is also, in embodiments of the disclosed technology, a connection or weld point between the two wires. A "weld point" is defined as a point where two wires are connected to each other through the melting and solidifying of metal. In some embodiments, the second wire 20 and third wire 30 are connected (forming a unitary structure by way of physical attachment), and in others, the second 20 and third 30 wires simply cross over each other at a midpoint 40.

The elements described herein below with respect to wire 20 are identical in wire 30, except that the elements have been incremented by 10. Referring now to the second wire 20, this wire has a vertical section 22 extending from the upper wire 10 to a bend 23. The bend 23, in embodiments of the disclosed technology, is acute (the angle of the bend between the wire sections 22 and 24 is acute. In this disclosure, "acute" and "right" angles are defined by the angle formed between two wires or wire sections on either side of the bend being described as "acute" or "right"). Between the acute bend 23 and another acute bend 25 is a length of wire 24 which rises from the acute bend 23 towards a plane defined by the wire 10, as the wire 24 approaches the second acute bend 25. A second vertical section 26 of the wire extends from the second acute bend to a horizontal base section 28 of the wire 20. A right angle bend 27 separates the vertical section 26 from the horizontal section 28. The horizontal section 28 forms a base for placement of a fuel 50, such as a heat source found in a can which is lit with a fire.

The wire 30 has identical elements, except that its numbers are incremented by 10. Thus, it has wire sections 32, 34, 36, and 38 with bends 33, 35, and 37. Further, each wire is numbered identically on each side of its midpoint 40. Therefore, there is a point of reflection of symmetry about the midpoint 40 of each wire, and the chafing stand has points of symmetry demonstrated by each of the views— from the narrow side, from the long side, above, and below. Using the upper wire 10 as a guide, a line of symmetry passes through, and perpendicular to, a middle of each narrow side, the middle of each wide side, and each corner making for a total of at least four lines of symmetry. Thus each 25% section of the wire chafing stand can be reflected twice to produce the device. Further, each individual wire has identical parts on either side of the midpoint.

Stated further, sections of each of lower wires 20 and 30, in embodiments of the disclosed technology, which are between a juncture with the upper wire 10 at weld point/connection point 11 and the midpoint 40 have, in order, two acute bends (23 and 25/33 and 35) and one right angle bend (27/37). Further, each of lower wires 20 and 30, in embodiments of the disclosed technology, has two vertical sections (22 and 26/32 and 36) which surround a section 24/34 at an angle to a plane defined by the top wire 10.

A holding area for a heat source 50 has sidewalls which are the vertical sections 26/36 closest to the midpoint. A bottom of the chafer stand (equidistant and furthest from the plane defined by the enclosed upper loop 10) is along, or substantially along, the bottom of each acute bend 23/33 and the horizontal sections 28/38. Thus, viewed another way, a triangle is formed between these bottom points 23 and 37 and the ground. Four such triangles are formed, each having a right angle at bend 27 (or 37) and hypotenuse along wire section 24 (or 34).

To produce the wire chafing stand disclosed, one can produce one length of wire which is bent into a rectangle forming loop 10, and another length of wire which is bent in six places (acute bend 23 twice, acute bend 25 twice, right angle bend 27 twice). The "another length of wire" can be produced twice, one being lower wire 20 and the other being lower wire 30. The wires 20 and 30 can then be attached to each other at their respective midpoints 40 which is also a weld point in such an embodiment. A "length of wire", for purposes of this disclosure, is defined an elongated metal (such as steel) piece which is forged as one unit, or forged as multiple units which are later joined together such as by way of welding. The wires 20 and 30 are each additionally attached at their respective ends to the loop 10, at four distinct weld points each numbered 11 (due to their symmetry with each other).

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope.

Combinations of any of the methods, systems, and devices described herein above are also contemplated and within the scope of the invention.

I claim:

1. A method of forming a wire chafing stand, said wire chafing stand comprising:
   a single fuel receptacle area, providing an upper wire formed in a loop,
   a first half of a first lower wire extending, in order, perpendicularly from said upper wire until reaching a first acute angle bend, then extending until a second acute angle bend, then extending perpendicularly to said upper wire until reaching a perpendicular bend, and then extending in parallel to said upper wire,
   a second half of said first lower wire forming a symmetrical image of said first half of said lower wire, and
   a second lower wire substantially identical in size and shape to said first lower wire, fixedly connected perpendicularly to said first lower wire, said method proceeding by
   forming said loop from said upper wire;
   providing said first acute angle bend, said second acute angle bend, and said perpendicular bend; crossing said first lower wire and said second lower wire over each other to define a midpoint of each said first and second lower wires; attaching said first lower wire and said second lower wire to said loop at each end of each said first lower wire and said second lower wire;
   attaching said first lower wire and said second lower wire to each other at said midpoint.

2. The method of claim 1, wherein said second and third lengths of wire are perpendicular or substantially perpendicular to each other.

3. The method of claim 2, wherein said midpoint is surrounded by four lengths of wire which are parallel to said closed loop.

4. The method of claim 3, wherein a section of said second wire between said closed loop and said first acute bend is perpendicular to said closed loop.

5. The method of claim 4, further comprising a step of welding said wire chafing stand in exactly five places:
   once at said midpoint connecting said second wire to said third wire;
   once at each end of each said second and third wire connecting said second and said third wire to said closed loop.

6. A wire chafing stand having two lines of symmetry and a single fuel receptacle, comprising:
   an upper wire formed in a loop;
   a first half of a first lower wire extending, in order, perpendicularly from said upper wire until reaching a first acute angle bend, then extending until a second acute angle bend, then extending perpendicularly to said upper wire until reaching a perpendicular bend, and then extending in parallel to said upper wire;
   a second half of said first lower wire is symmetrical with respect to said first half of said lower wire;
   a second lower wire substantially identical in size and shape to said first lower wire, fixedly connected perpendicularly to said first lower wire.

7. The wire chafing stand of claim 6, wherein a midpoint of said first lower wire and said second lower wire is an attachment point where said first lower wire and said second lower wire are fixedly attached.

8. The wire chafing stand of claim 7, wherein said first acute bend and said portion of said wire extending parallel to said upper wire are equidistant from a plane defined by said upper loop.

9. The wire chafing stand of claim 8, wherein said second acute bend is a closest portion of said first lower wire to said plane defined by said upper loop other than said portion which extends perpendicularly from said upper wire.

10. A wire chafing stand, comprising:
- a first lower wire and second lower wire which are substantially identical in size and shape to each other and at right angles to each other;
- a single intersection point of said first lower wire to said second lower wire at a midpoint of each respective wire;
- a point of symmetry of each of said first lower wire and said second lower wire at said midpoint of each respective wire;
- an upper wire connected to said first lower wire at two points and said second lower wire at two points; and
- a receptacle formed from a straight length of wire of said first lower wire and a straight length of wire of said second lower wire, each said straight length of wire passing through said midpoint; and
- an acute angle bend between said receptacle and each respective end point of each said first and said second lower wire.

11. The wire chafing stand of claim 10, further comprising:
- four vertical sections of wire extending from said upper wire at a right angle there-to, wherein said first lower wire comprises two of said four vertical sections, and said second lower wire comprises two of said four vertical sections.

12. The wire chafing stand of claim 11, further comprising:
- four angled sections of wire, each extending from a respective one of said four vertical sections of wire to a portion of wire extending from said respective one of said four vertical sections of wire emanating from said perpendicular bend.

13. The wire chafing stand of claim 12, further comprising:
- a weld point attaching said single intersection point of said first lower wire to said second lower wire, fixedly connecting said first lower wire to said second lower wire.

14. The wire chafing stand of claim 13, further comprising:
- four additional weld points on said chafing stand, each connecting said upper wire to one of said first lower wire or said second lower wire.

15. The wire chafing stand of claim 14, further comprising a heat source receptacle having four vertical side walls and one horizontal lower wall formed 50% from said first lower wire and 50% from said second lower wire.

* * * * *